Patented Apr. 11, 1939

2,153,660

UNITED STATES PATENT OFFICE 2,153,660

BONDING OF COMPOSITE ARTICLES WITH POLYMERIZED ADHESIVES

George I. Clapp, Wells, Maine

No Drawing. Application September 26, 1936, Serial No. 102,800

2 Claims. (Cl. 154—40)

The invention relates to the bonding of fibrous and cellulosic material for making composite articles.

The invention contemplates the use of a heat polymerized material product as the essential bonding agent, and the objects of the invention are:

To enable heat polymerized material to be spread after it has been advanced, or heat treated, to the point where it has developed toughness and strength sufficient for bonding purpose so that further application of heat to set the bonding material is unnecessary. The reason for this object is that it is oftentimes difficult, and expensive, to apply heat to a composite bonded article for setting the material forming the bond. The bonded elements of the composite article are oftentimes of heat insulating material which does not lend itself to a uniform rapid penetration of heat as is normally necessary to set, or cure, the bonding material, to say nothing of the fact that such application of heat is apt to either injure the article, or require some subsequent treatment; to avoid the use of volatile solvents in the spreading of the bonding material, or glue. Such solvents are apt to disfigure the bonded article by penetrating, or soaking, into it, especially if it be of wood, and the lack of volatile material also makes the moisture content of the wood less critical, which is a practical advantage, and there is no danger of blistering, or blowing, if heat be applied without pressure. Volatile solvents are difficult to drive off. They add nothing to the bond itself, are fire hazards, and costly; and to reduce the cost of the bonding or glue line. Polymerizable materials useful for bonding purpose are all moderately expensive. If they can be spread uniformly thin their strength is still sufficient to form a good bond and the cost is reduced. Where the spreading is done by water, or a solvent employed, not only does the polymerizable material have to be further heated, but after the water has been dispersed, or the solvent driven out, there is left only ten to twelve pounds of material per one thousand feet of surface, with large voids, and no proper continuity of fill. It is my object to obviate this difficulty, and provide in the bond a continuous film without voids.

The invention consists in dispersing a re-active heat polymerizable material, after it has been advanced or heat treated to a point where it has developed toughness and sufficient bond forming strength when allowed to set, in a non-polymerizable thermoplastic carrying agent. A heat polymerizable material cannot be spread per se after it has been advanced, or heat treated, to the point where it will form a permanent bond when set.

The actual point to which any re-active thermoplastic agent should be heated to form a permanent adhesive bond when set is known to those skilled in the art. (Usually a temperature of 400° F. will be sufficient. In some cases a temperature of 550° F. is required.) The re-active product is advanced by heating to a comparatively inert stage either before dissolving in the carrying medium, or may be advanced in the presence of the carrying medium.

The re-active heat polymerizable materials which may be used comprise synthetic resins of the heat setting type, including especially phenolic resins, and the so-called drying and semi-drying oils such as tung oil, linseed oil and soya bean oil.

The non-polymerizable thermoplastic carrying agents which may be used comprise natural gum resin, Congo gum, the vinyl esters, polymerized petroleum products, gums, or any medium which gives a comparatively solid film at room temperature, and in which the heat hardened product may be dispersed. The carrier should be water repellent, preferably quick drying, and preferably of some adhesive value.

The relative proportions of re-active and non-re-active material used for obtaining the best results will depend upon the materials and result desired to be attained. For example:

100 lbs. of Perilla oil is heated at 400° F. until the body has increased to almost a gel. A two-foot string from glass is a convenient stopping point. 150 lbs. of ester gum and 150 lbs. of rosin are then added and the whole mass run up to 600° F. for about fifteen minutes, and then allowed to cool. It is then ready for use as described below.

100 lbs. of China-wood oil are bodied at 400° F. to a string, and 100 lbs. of gum rosin added, the whole stirred vigorously until the temperature has risen to 400° F. again, held there for ten minutes and allowed to cool.

100 lbs. of a liquid phenolic resin of about 80% solids is heated with 400 lbs. of gum rosin at 400° F. with agitation for two hours. The whole may be used per se or used to mix with a bodied oil.

The adhesive is applied either from heated rolls or from a heated tank where it is kept fluid enough to spread. After the application of the adhesive to the surface of the elements or parts which form the composite article, this is immediately subjected to sufficient pressure for a sufficient time as will produce a definite permanently set glue line. No further heating is necessary. The moisture content of the composite article, especially if it be wood, is apparently not a critical factor.

In some cases a mutual non-volatile solvent may be desirable, or even necessary, and by "non-volatile solvent" is meant a high boiling product which is not volatile enough to be driven out, such as phenol, etc. Some materials, like starch, are not as readily dispersible in molten thermoplastic products, in which case a third substance is used as a mutual solvent. It is difficult to suspend highly polymerized phenolic resins of the thermo-setting type in anything by themselves. They will go into large quantities of rosin but a mutual solvent aids their dispersion. The solvent might even be different kinds of thermoplastic resins instead of one, in order to increase dispersibility. Examples of the adhesive where a mutual solvent is desirable, are as follows:

100 lbs. of starch is stirred with 25 lbs. of cresol or phenol at 100° C. (212° F.) until well dispersed. 300 lbs. of molten rosin is then added and the temperature raised to 400° F. for two hours. The mass is then allowed to cool.

100 lbs. of liquid phenolic resin is heated with stirring at 200° F. until it is set to a stiff gel. 25 lbs. of cyclohexanol is then stirred in and allowed to set at 200° F. with agitation until apparently homogeneous. This mass is then readily dispersible in as little as equal parts of molten rosin.

While reliance is made upon the polymerized agent for attaining the essential adhesive effect, or bond, yet the carrying agent assists in the initial sticking, as well as in dispersing the true bond. It also acts to a certain extent as a filler for rough elements of the composite article, especially rough cut wood, though other tenders, such as clay, may be added for the purpose of filling.

I claim:

1. The method of bonding together sheets of cellulosic or fibrous materials to form composite articles with a heat polymerized synthetic resin of the heat settable type without the addition of a volatile thinner or the addition of heat after its application to said materials, which comprises applying to the surfaces of the cellulosic or fibrous material a molten mixture of a synthetic resin of the heat setting type polymerized to a normally non-spreadable state and of a toughness and bond-forming strength to produce a glue line of permanently set polymerized material after its application to form the bond dispersed in a non-polymerizable thermoplastic carrying medium, applying pressure for a sufficient time upon the sheets of material while the bonding material is still in the molten condition as will produce a definite permanently set glue line.

2. The method of bonding together sheets of cellulosic or fibrous materials to form composite articles with a heat polymerized synthetic resin of the heat settable type without the addition of a volatile thinner or the addition of heat after its application to said materials, which comprises applying to the surfaces of the cellulosic or fibrous material a molten mixture of a synthetic resin of the heat setting type polymerized to a normally non-spreadable state and of a toughness and bond-forming strength to produce a glue line of permanently set polymerized material after its application to form the bond dispersed in a non-polymerizable thermoplastic carrying medium and a mutual non-volatile solvent, and which said polymerized resin in said dispersion is not blendable with said non-polymerizable thermoplastic carrying medium therein except in the presence of said mutual non-volatile solvent, applying pressure for a sufficient time upon the sheets of material while the bonding material is still in the molten condition as will produce a definite permanently set glue line.

GEORGE I. CLAPP.